United States Patent [19]

Sumitani et al.

[11] Patent Number: 4,811,257

[45] Date of Patent: Mar. 7, 1989

[54] ELECTRONIC CALCULATOR HAVING MEANS FOR DIRECTLY INPUTTING VARIABLES INTO A PRESTORED AND DISPLAYED EQUATION

[75] Inventors: Toshihiko Sumitani, Nara; Akira Natsuhara, Yamatokoriyama, both of Japan

[73] Assignee: Sharp Kabushiki Kaisha, Osaka, Japan

[21] Appl. No.: 711,021

[22] Filed: Mar. 12, 1985

[30] Foreign Application Priority Data

Mar. 13, 1984 [JP] Japan .................................. 59-49568

[51] Int. Cl.[4] .......................... G06F 7/38; G06F 15/02
[52] U.S. Cl. .................... 364/709.01; 364/706
[58] Field of Search ................................ 364/706, 709

[56] References Cited

U.S. PATENT DOCUMENTS

| | | | |
|---|---|---|---|
| 4,352,161 | 9/1982 | Hirano et al. | 364/706 |
| 4,386,412 | 5/1983 | Ito | 364/709 |
| 4,507,743 | 3/1985 | Haneda et al. | 364/709 |
| 4,519,045 | 5/1985 | Caldwell et al. | 364/709 |
| 4,636,970 | 1/1987 | Morino et a. | 364/706 |

FOREIGN PATENT DOCUMENTS

| | | | |
|---|---|---|---|
| 0186928 | 9/1985 | Japan | 364/706 |
| 0191355 | 9/1985 | Japan | 364/706 |

Primary Examiner—Gary V. g30kcom
Assistant Examiner—Long Thank Nguyen
Attorney, Agent, or Firm—Birch, Stewart, Kolasch & Birch

[57] ABSTRACT

An electronic calculator having a first input mode for inputting one or more algebraic equations, a display for displaying the variable terms of the input equations, and an indicator for selectively indicating any one of the variables being displayed. A second input mode is provided for inputting numeric data in a direct one-to-one relationship with the displayed variables, the input numeric data being simultaneously displayed with their corresponding variables. A calculator operation is performed by the device upon instruction by an operator whereby the input numeric data is substituted for the respective input variables for a selected equation. The display will show the result of the calculation in a position of the display corresponding to the position where an output variable term is displayed. Accordingly, a numerical calculation may be performed by selecting a stored equation and directly inputting numeric data in a one-to-one correspondence with variables in the displayed selected equation.

4 Claims, 12 Drawing Sheets

| # A = X ✕ ( Y − 1 ) + Y ✕ ( X + 1 )　/ # PROFIT=SALE |
| PRICE ✕ 0. 2 : TAKINGS = PROFIT+TAKINGS　/ # TOTAL |
| = A + B + C + D : AVERAGE = ----- |

Fig. 4

|   | (a) | (b) | (c) |
|---|-----|-----|-----|
| 0 | 1 | X | 100. |
| 1 | 1 | Y | 20. |
| 2 | 0̄ | A | 3920. |
| 3 |   |   |   |
| ⋮ |   |   |   |
| 9 |   |   |   |

(c) [ENT]
```
X            :Y           :A
100.         :_
```

(d) 20
```
X            :Y           :A
100.         :20_         :
```

(e) [ENT]
```
X            :Y           :A
100.         :20.         :3920.
```

(f) [◄]
```
X            :Y           :A
100.         :[2]0.
```

(g) 21
```
X            :Y           :A
100.         :21[.]
```

(h) [ENT]
```
X            :Y           :A
100.         :21.         :4121.
```

(i) [ENT]
```
X            :Y           :A
_
```

Fig. 10

(a)
| SALE PRICE | : PROFIT | : TAKINGS |
|---|---|---|
| — | | |

(b) 1000
(OR 500×2)
| SALE PRICE | : PROFIT | : TAKINGS |
|---|---|---|
| 1000 — | | |

(c) [ENT]
| SALE PRICE | : PROFIT | : TAKINGS |
|---|---|---|
| 1000. | : 200. | : 200. |

(d) [◀]
| SALE PRICE | : PROFIT | : TAKINGS |
|---|---|---|
| [1]000. | | |

(e) 12
| SALE PRICE | : PROFIT | : TAKINGS |
|---|---|---|
| 1[2]00. | | |

(f) [ENT]
| SALE PRICE | : PROFIT | : TAKINGS |
|---|---|---|
| 1200. | : 240. | : 440. |

Fig. 11(A)

| | | A | :B | :C |
|---|---|---|---|---|
| (a) | | _ | | |

| | | A | :B | :C |
|---|---|---|---|---|
| (b) | 10 | 10 _ | | |

| | | A | :B | :C |
|---|---|---|---|---|
| (c) | [ENT] | 10. | :_ | |

| | | A | :B | :C |
|---|---|---|---|---|
| (d) | 20 | 10. | :20 _ | |

| | | A | :B | :C |
|---|---|---|---|---|
| (e) | [ENT] | 10. | :20. | :_ |

| | | A | :B | :C |
|---|---|---|---|---|
| (f) | 30 | 10. | :20. | :30 _ |

| | | B | :C | :D |
|---|---|---|---|---|
| (g) | [ENT] | 20. | :30. | :_ |

| | | B | :C | :D |
|---|---|---|---|---|
| (h) | 40 | 20. | :30. | :40 _ |

| | | C | :D | :TOTAL |
|---|---|---|---|---|
| (i) | [ENT] | 30. | :40. | :100. |

| | | D | :TOTAL | :AVERAGE |
|---|---|---|---|---|
| (j) | ▶ | 40. | :100. | :25 |

| | | C | :D | :TOTAL |
|---|---|---|---|---|
| (k) | ◀ | 30. | :40. | :100 |

| | | B | :C | :D |
|---|---|---|---|---|
| (ℓ) | ◀ | 20. | :30. | :[4]0. |

Fig. 11(B)

| | | A | B | C |
|---|---|---|---|---|
| (m) | ◀ | 10. | 20. | ③0. |
| (n) | ◀ | 10. | ②0. | 30. |
| (o) | 50 | 10. | 50.☐ | 30. |
| (p) | ENT | 10. | 50. | ③0. |

| | | C | D | TOTAL |
|---|---|---|---|---|
| (q) | ENT | 30. | 40. | 130. |

| | | D | TOTAL | AVERAGE |
|---|---|---|---|---|
| (r) | ▶ | 40. | 130. | 32.5 |

Fig. 12

| | | A | B | M |
|---|---|---|---|---|
| (a) | | _ | | |
| (b) | 10000000 | 10000000_ | | |
| (c) | ENT | 10000000. : _ | | |
| (d) | 30 | 10000000. : 30_ | | |

| | | B | M | D |
|---|---|---|---|---|
| (e) | ENT | 30. | 300000000. | 33333 |

| | | M | D | |
|---|---|---|---|---|
| (f) | ▶ | 300000000. | 333333.3333 | |

Fig. 13

(a) ⊞ ENT
| #A | #PROFIT | #TOTAL |
| #M | #HIGH | |

(b) ▶
| ⊞A | #PROFIT | #TOTAL |
| #M | #HIGH | |

(c) ▶
| #A | ⊞PROFIT | #TOTAL |
| #M | #HIGH | |

(d) ENT
PROFIT= SALE PRICE ✕ 0.2 : TAKINGS = PROFIT + TAKINGS (e) ↓
TOTAL  = A + B + C + D : AVERAGE = TOTAL /4

(f) ↓
M = A ✕ B : D = A / B
HIGH = LENGTH ✕ TAN (ANGLE)

(g) ↓
HIGH = LENGTH ✕ TAN (ANGLE)

Fig. 14

```
A           10.
B           20.
C           30.
D           40.
TOTAL      100.
AVERAGE     25.
```

ELECTRONIC CALCULATOR HAVING MEANS FOR DIRECTLY INPUTTING VARIABLES INTO A PRESTORED AND DISPLAYED EQUATION

FIELD OF THE INVENTION

The present invention relates to an electronic calculator for executing calculation of one or more equations by merely inputting numeric data without programming.

BACKGROUND OF THE INVENTION

Conventional electronic calculators of a handy type are so constructed that an operation or calculation of an equation can be executed by a computer program written in BASIC or other such programming language. The programming language is provided with a number of predetermined instructions and commands and a desired program can be composed by using these instructions and commands.

However, in the conventional personal electronic calculators of the above type, even in performing a numeric calculation of a simple equation by substitution of the numeric data, a program of the equation must be composed and loaded in the computer. Thus, conventionally, it takes a long time to prepare a computer program for calculating even a simple equation, thus a prompt and easy processing of a calculation with the conventional electronic calculator has been difficult.

SUMMARY OF THE INVENTION

An essential object of the present invention is to provide a calculator which is able to execute a numeric calculation by entering the numeric data directly in the calculator without loading a program composed with the program language.

Another object of the present invention is to provide an electronic calculator for executing a numeric calculation promptly and easily.

According to one aspect of the present invention there is provided an electronic calculator including a first input mode for inputting one or more algebraical equations, each equation including an output variable term and at least one input variable term with operating elements, a first memory for storing the respective equations, a second memory for storing each name of the respective variable terms, a display for displaying the names of the variable terms, a cursor for indicating selectively any one of the names of the variable terms displayed on the displaying means, a second input mode for inputting numeric data corresponding to the name of the variable terms indicated by the cursor, a third memory for storing the numeric data input in the second input mode, a device for executing a calculation of a selected equation by substituting the numeric data input in the second input mode in the respective input variable terms of the selected equation and displaying the result of the calculation in a position of the display corresponding to the position where the output variable term is displayed.

BRIEF EXPLANATION OF THE DRAWINGS

FIGS. 9(a) through 9(i) show examples of key inputs and contents displayed by the calculator;

FIGS. 10(a) through 10(f) show examples of key inputs and contents displayed by the calculator for calculating total TAKINGS;

DETAILED EXPLANATION OF A PREFERRED EMBODIMENT

Figure 1:
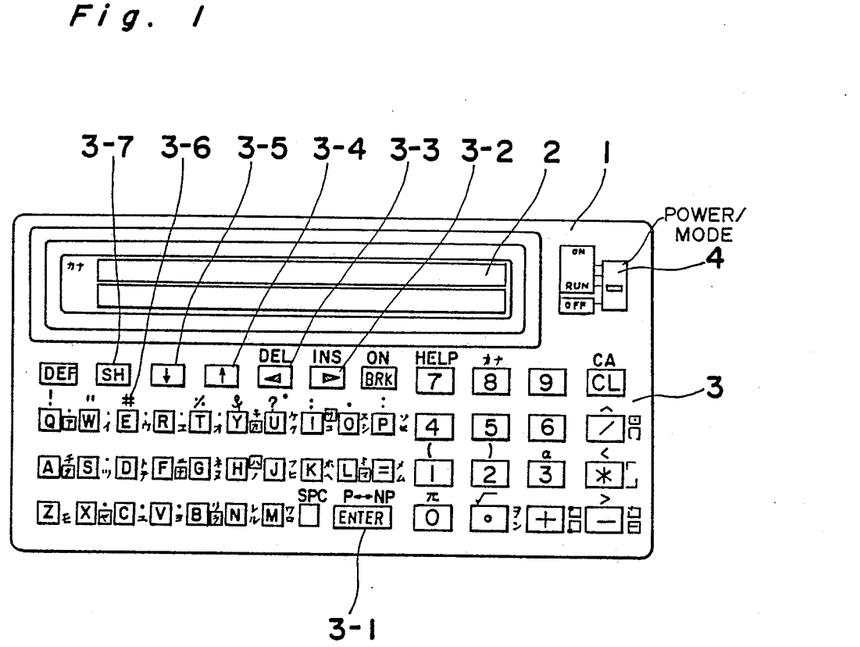
FIG. 1 is a top plan view showing one example of an electronic calculator according to the present invention.

Referring to FIG. 1, reference numeral 1 denotes a calculator body, 2 denotes a display unit formed by a liquid crystal display device having two rows of numeric display members each row having 24 digits. Reference numeral 3 denotes a keyboard having a plurality of input keys such as an ENTER key 3-1, DISPLACE keys 3-2 and 3-3 for shifting the contents displayed in the display unit 2 in both left and right directions, SCROLL keys 3-4 and 3-5 for shifting the contents displayed in the display unit 2 in both upward and downward directions and a function key 3-6 for inputting a symbol # in association with a SHIFT key 3-7. A POWER and MODE switch 4 is operable to be switched over toward a program mode in PRO position and a program executing mode in RUN position.

In the calculator shown in FIG. 1, in order to calculate an algebraic equation $$A = X \times (Y-1) + Y \times (X+1) \tag{1}$$

only the following key operation is needed with the switch 4 changed toward PRO mode.

$$\#A = X \times (Y-1) + Y \times (X+1) \boxed{ENT}.$$

$\boxed{ENT}$ in the above operation means operation of the ENTER key 3-1.

It is appreciated that the order of the above key operation is the same order of each term of the above equation.

In the above operation, the key # is entered at the leading portion of the operation for discriminating the equation from a BASIC program.

The calculator described above is so arranged as to execute calculation of various equations including the above equation by conventional programming using BASIC language upon setting the calculator in the PRO mode.

In the above equation (1), the item A is an output variable term, and X and Y in the right side are the input variable terms, which are substituted by numerical data entered by numeric keys 0 through 9, whereby calculation of the equation can be executed and the output variable term can be obtained by the calculator as a result of the calculation.

Execution of the calculation entered in the PRO mode is enabled by switching over the switch 4 toward RUN mode and in turn operation of keys # A [ENT] causes the display unit 2 to display as shown in FIG. 9a. More specifically the names of the input variable terms X and Y and the output variable term A is displayed in the upper half of the display unit 4 with a predetermined space with a cursor (—) displayed below the input variable term X.

After inputting numeric data 100 as shown in FIGS. 9b and 9c, then inputting the data 100 by operation of [ENT] key, the data 100 is stored in a predetermined memory area of a memory for the variable X of a work area, the details of which will be explained later and the data 100 can be displayed below the X display. The cursor can shift to below the Y display. Similarly, inputting the data 20 of the Y variable term and operation of [ENT], the numeric data 20 can be stored in another memory area for the Y variable of the work area and the data 20 can be displayed below the Y display (FIG. 9d). The equation (1) entered as described above can be operated on the basis of the data of the input variable terms stored in the work area and the result (the value 3920) of the calculation of the equation (1) can be stored in the memory area of A of the work area and the result 3920 can be displayed below the A display.

Figure 2:
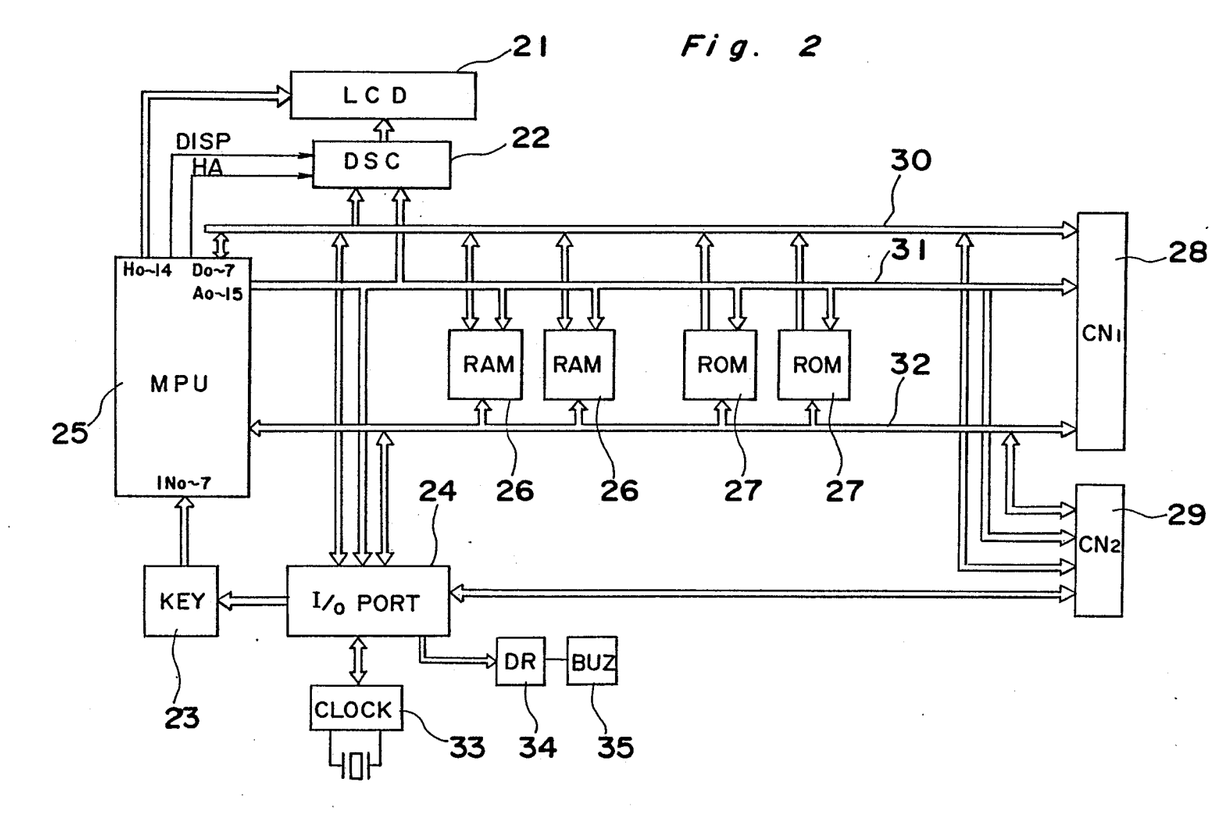
FIG. 2 is a block diagram of the electronic calculator shown in FIG. 1.

Details of the operation described above will be described hereinafter with reference to FIG. 2, in which the display unit (LCD) 21 corresponding to the display unit 2 in FIG. 1 is composed of liquid crystal display elements and each of the display segments thereof is turned on or off by a display control circuit (DSC) 22.

A key input device 23 is adapted to receive key strobe signals through an I/O port 24 to output a key return signal to a microprocessor unit (MPU) 25. Read and write memories (RAM) 26 serve to store various programs and to act as registers, flags and buffer memories. Read only memories ROM 27 serve to store interpreters for executing the programs and control programs. A connector 28 is provided for connecting further optional RAM and ROM modules and the connector 28 and the optional RAM and ROM modules are coupled with the MPU25 through a data bus 30, address bus 31 and control bus 32. Another connector 29 is also provided for coupling various input or output devices such as a tape recorder or printer and the connector 29 is coupled with MPU 25 through the buses 30, 31 and 32.

The input and output port 24 feeds a series of strobe signals to the key input device, acting to input and output the clock data for a clock circuit 33 and further feeds a drive signal for a driving circuit 34 for driving a buzzer 35. MPU 25 outputs synchronizing signal HA and DISP signal for turning on and off the display unit 21 and further outputting back plate signals $H_{0\sim 14}$ for the display unit 21. The display control circuit 22 contains a display memory device corresponding to the respective displaying segments of the display unit 21 and by writing the display patterns the display unit 21 can display desired characters or symbols.

Figure 3:
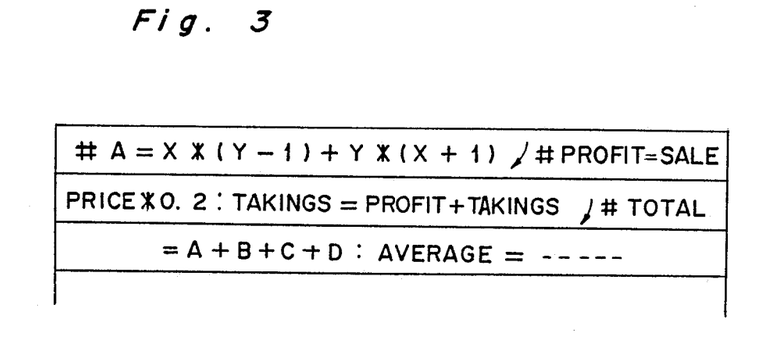
FIG. 3 is a schematic diagram showing one example of the stored data in a RAM used in the electronic calculator shown in FIG. 2.

The equation entered in the calculator under the PRO mode can be stored in the equation storing area of the RAM 26. FIG. 3 shows an example of the stored equations. Each of the equations can be separated by the mark code (ENTER code).

Operation of the calculator as constructed above is explained hereinafter.

In RUN mode, when an output variable term or the left side of the equation is instructed, the name of the output variable term thus instructed is searched from the memory area of RAM 26, whereby the name (A) of the output variable term and the names of the input variable terms (X, Y) are separately stored in the memory areas of the variable terms of the work area.

Figure 4:
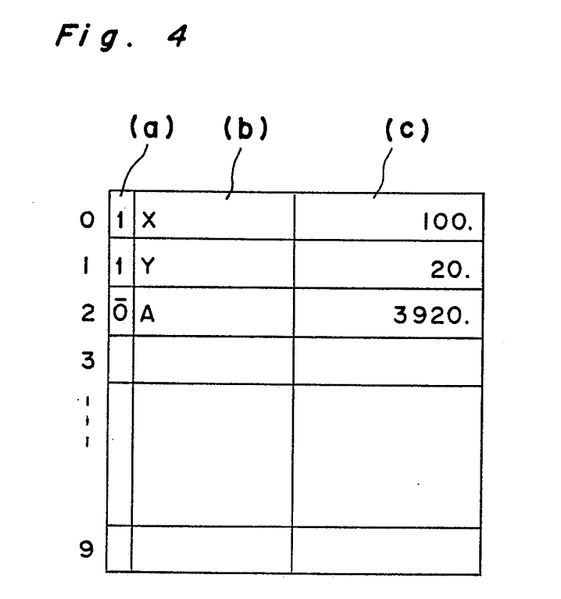
FIG. 4 is a schematic diagram showing one example of a working area in the RAM.

FIG. 4 shows one feature of the stored data of the word area means provided in RAM 26, wherein (a) shows the memory area of the name of the variable terms, (c) shows the memory area for storing the numeric data for the respective variable terms and (a) shows the memory area for storing properties of each of the respective terms such as an input term or an output term with '1' for the input terms and '0' for the output terms.

The following description is made to explain the procedures for searching the input variable terms (x,Y) and the output variable terms (A) and storing the data of the respective variable terms in the memory areas of the work area.

Figure 5:
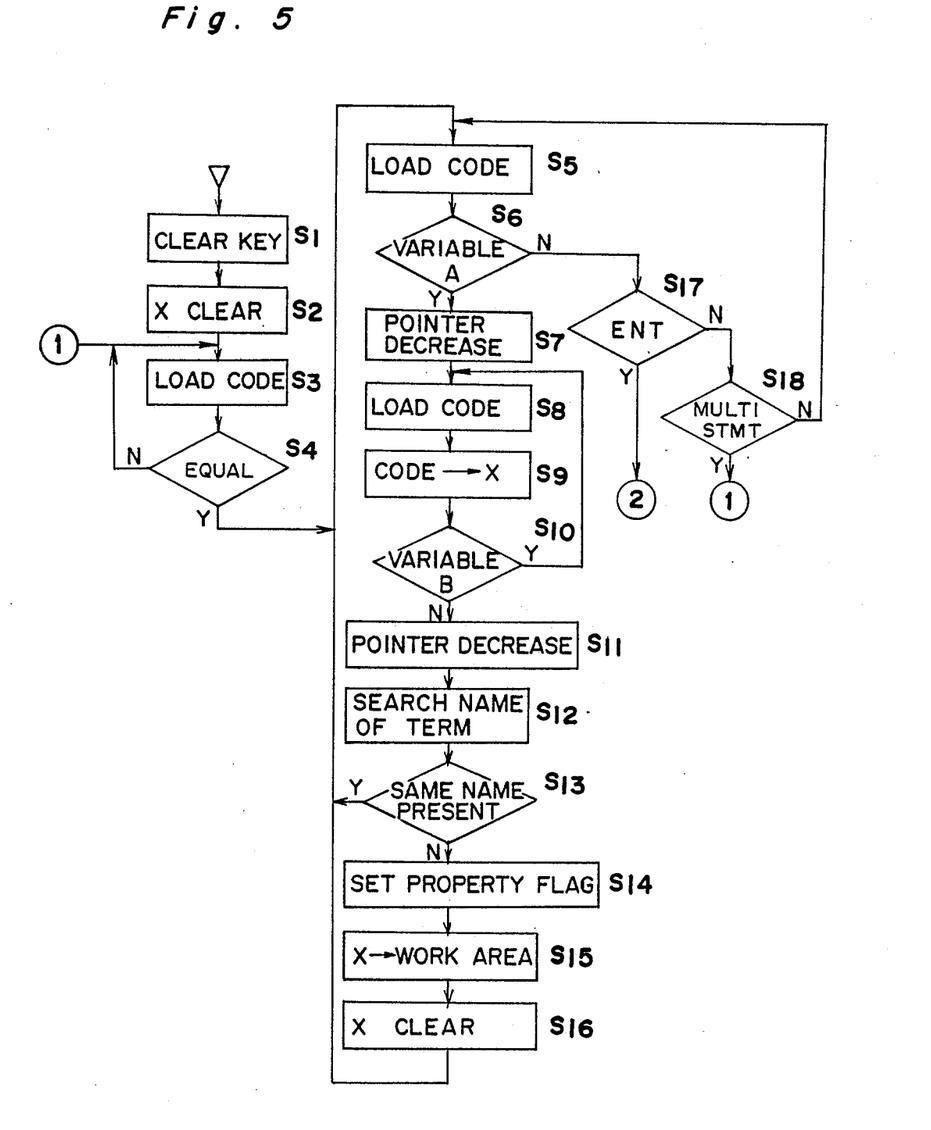
FIG. 5 is a flow chart showing the procedures for searching input variables and storing thereof in a work area.

As to the input variable terms, referring to FIG. 5, an X register for storing the name of the variable terms loaded from the work area and the memory means of RAM 26 for storing the respective equations is cleared off in the steps S1 and S2. Thereafter, the equation accessed already in the equation memory area is loaded from the leading part of the equation on a code by code basis in steps S3 and S4. When the equal code "=" is detected in the step S4, the subsequent code i.e., the leading part (the character X in this example) of the right side of the equation is loaded in the X register in step S5, and in turn it is judged whether the leading code loaded in step S5 corresponds to the leading character (X in this example) of the name of the variable term in step S6. In a case where the leading part judged is the leading character, the content of a pointer is decreased by 1, the respective codes are loaded and stored in the X register sequentially from the leading character in steps S7 through S10. When all of the names of the variable terms (X and Y in this example) are completely stored in X register, (this can be judged by detecting that the code judged is any one of the codes of the functional terms such as +,—,x or ÷ or instruction codes) the pointer is further decreased by 1 and in turn it is judged whether the name of the variable term stored in X register exists already in work area of RAM in the steps S10 through S13. If the same name of the variable term is absent in the working area means, the property flag is set by "1" for the input variable term, then the flag 1 and the content of X register i.e., the name of the input variable term are input into the work area, whereby the X register is cleared off and the program flow returns to step S5.

By repeating the operation as described above, all of the variable terms in the right side of the equation can be entered in the working area of RAM 26. When the above equation (1) is taken as an example, as shown in FIG. 4, the value '1' representing the input variable term and the names X and Y of the input variable terms can be respectively stored in the areas (a) and (b) of the addresses 0 and 1 of the memory areas.

In a case where the code does not correspond to the leading character of the name of the variable terms in step S6, the program flow advances to step S17, wherein if "ENTER" code " ↲ " attached to the end of the equation is not detected, the absence or presence of the multi statement ":" is judged in the subsequent step S18. If ":" is present, the program flow goes to step S3 and ":" is absent, the program flow goes to step S5.

Figure 6:
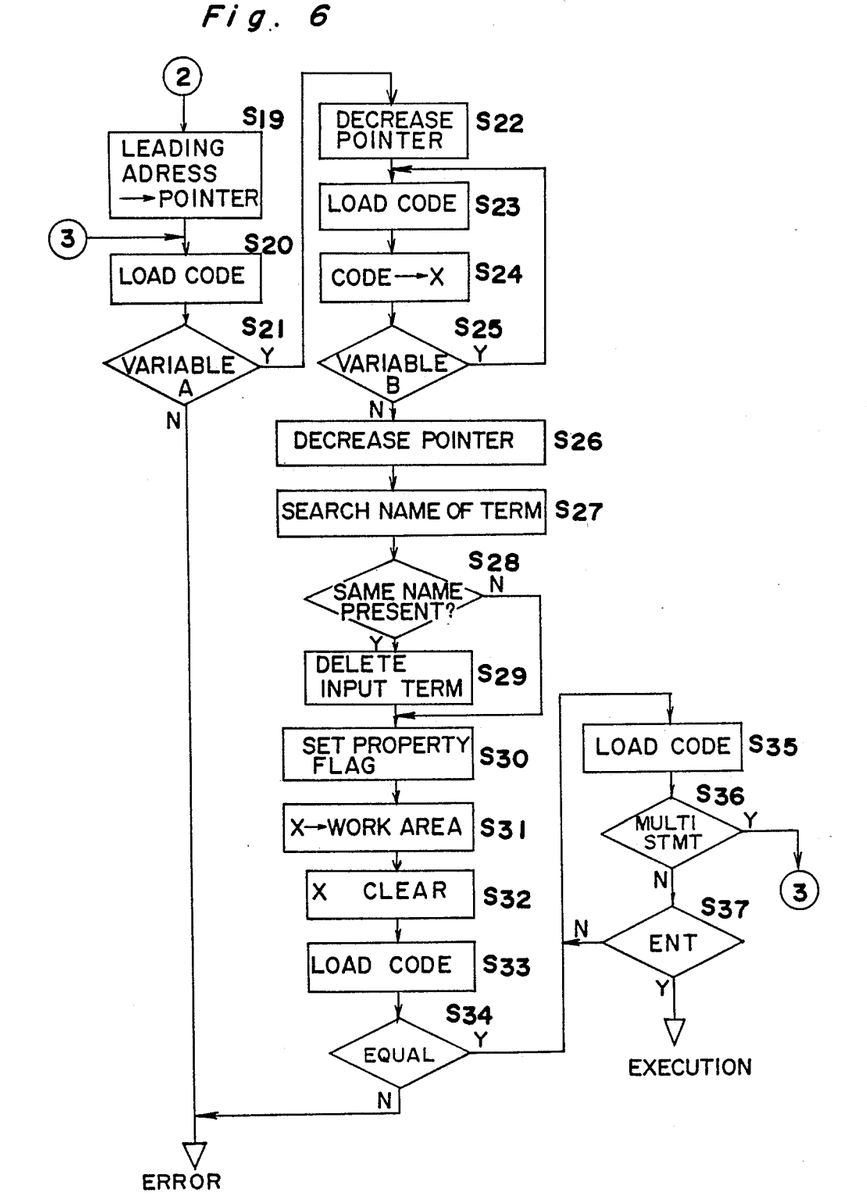
FIG. 6 is a flow chart showing procedures for searching output variables and storing thereof in the work area.

When the search is made up to the end of the equation, then the ENTER code " ↲ " is detected, the program flow advances to step S19 of the procedure shown in FIG. 6 for searching the name of the output variable term.

In step S19, the content of the pointer is returned to the leading address to take the left side of the equation. In detail, the leading code of the left side is loaded in step S20 and it is judged that this code corresponds to the leading character of the name of the variable term in step S21. If the code corresponds to the leading character, the content of the pointer is decreased by 1, causing the series of the codes to be loaded sequentially from the leading character code to store them in the X register in steps S22 through S25. When all of the codes of the name of the output variable term are completely stored in X register, the content of the pointer is decreased by 1, whereby it is judged whether the name of the variable term stored in X register is already contained in the work area of RAM 26 in steps S26 through S28. If the same name of the output variable term is already contained in the work area, the contained name is deleted and the name stored in X register is contained in the work area with the property flag in steps S29 through S31. The content depicted in the address 2 of the work area in FIG. 4, wherein the memory area (a) stores "0" representing the name of the output variable term with the name of the output variable term "A" being stored in the area (b).

Figure 7:
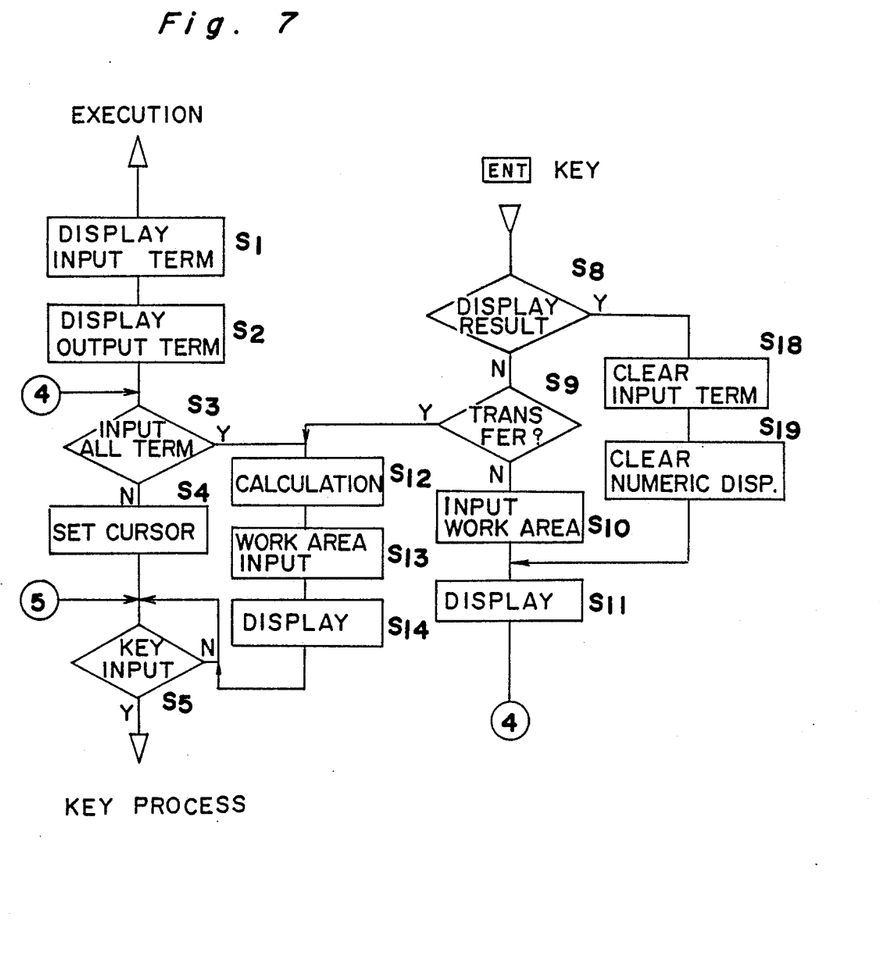
FIG. 7 is a flow chart showing procedures for execution of calculation of a numeric equation.
Figure 8:
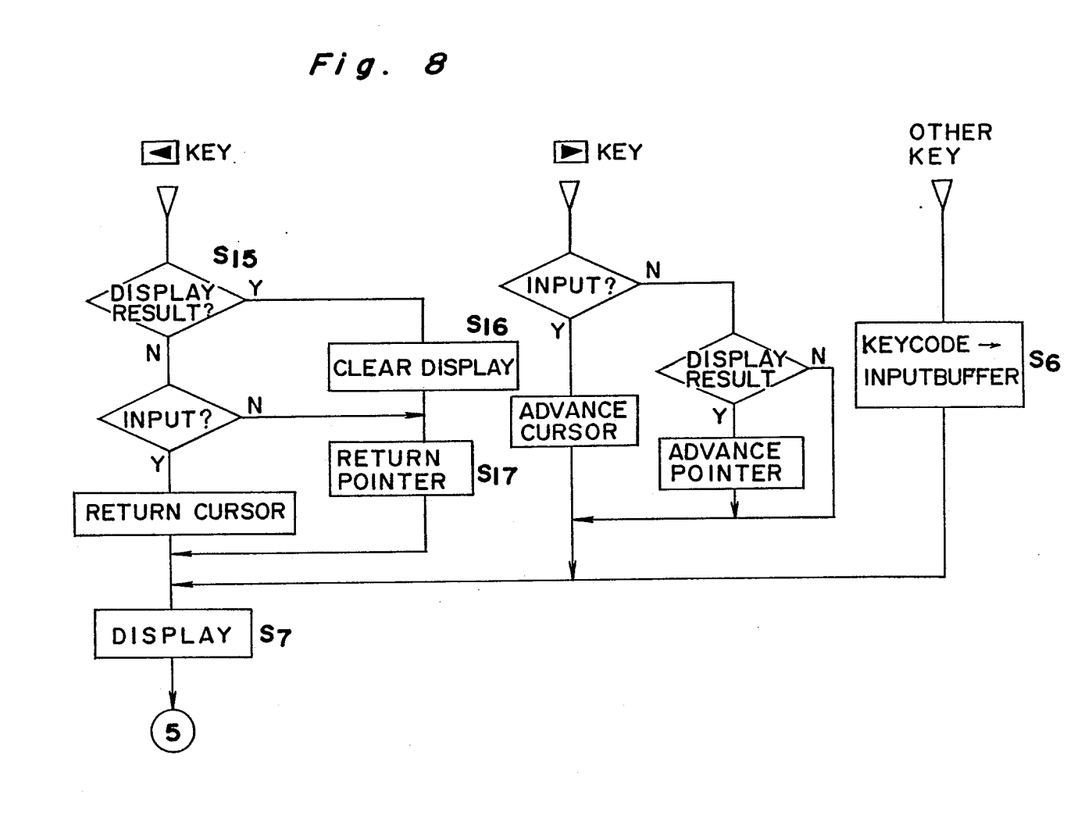
FIG. 8 is a flow chart showing procedure for key inputs.

After the name of the output variable term is stored as described above, the X register is cleared, and in turn subsequent codes are subjected to the judgement for detection of the code representing "=" in steps S32 through S34. Further, the respective codes are loaded for the judgement of the code of the separation ":" of the multi statements in step S36. If there is the code of the separation ":", the program flow goes to step S20. On the contrary, if there is no separation code ":", the presence or absence of the ENTER code " ↲ " is judged in step S37. With the presence of the ENTER code " ↲ ", the program flow advances to the procedures shown in FIGS. 7 and 8.

After the equation is entered in the calculator under PRO mode, the mode switch 4 is changed over toward the RUN mode by the operator. Then the operator inputs the name of the output variable term of the equation by the operation # A $\boxed{\text{ENT}}$, whereby the procedures S1 through S5 shown in FIG. 7 can be executed. With the operation described above, the respective names of the output variable term A and input variable terms X and Y are displayed by the display unit 2 as shown in FIG. 9(a) with the cursor below X.

Figure 9:
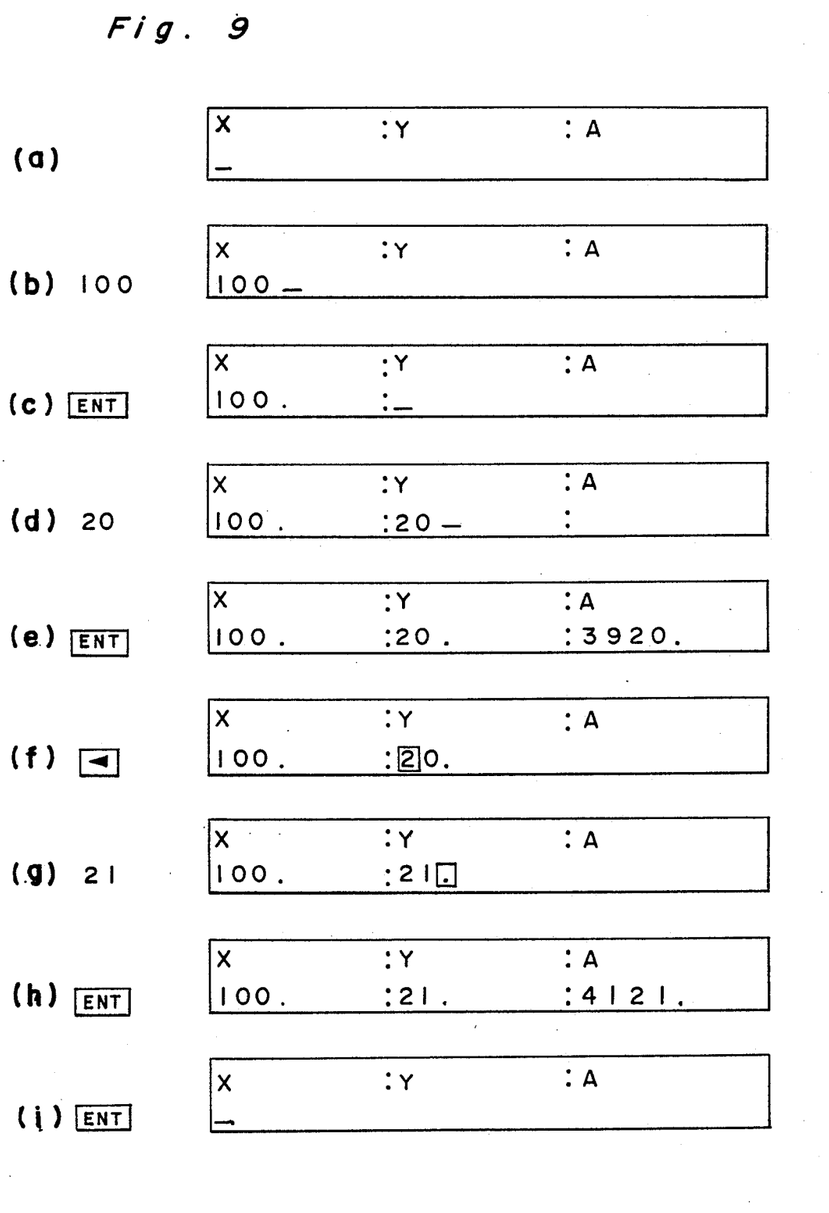

Inputting numeric data 100 for example by the numeric keys, the codes of the numeric data are input in the input buffer and the data 100 is displayed below the term X (see the steps S6 and S7 and FIG. 9(b). Operation of the ENT key causes the numeric data 100 stored in the input buffer to be transferred to the memory area of the name of the variable term X of the work area of RAM 26 (see FIG. 4). When the input operation of the data 100 of the input variable term X is completed, the cursor is displaced below the name of another input variable term Y on the display unit 2 to allow entering the numeric data of the term Y. With input of the data 20 for example, the data 20 also displayed below the term Y as shown in FIG. 9(d). By the operation of ENT key, the data 20 is stored in the corresponding memory area of the work area of RAM 26 and the data 100 and 20 of the input variable terms stored in the work area are substituted in the equation stored in RAM 26 and subjected to the calculation according to the equation. The result of the calculation (3920 in this example) is transferred to the memory area of the work area corresponding to the memory area in which the output variable term A is stored as shown in FIG. 4 and the result of the calculation can be displayed on the display unit as shown in FIG. 9 through steps S3–S12 through S14.

A way to change the numeric data of the respective input variable terms X and Y in the calculator according to the present invention will be explained hereinafter.

In order to change the data of the variable term Y, a DELETE key 3-3 is operated one time during display of the result of the calculation as shown in steps S15 through S17–S7. Upon operation of DELETE key 3-3 one time, the displayed result on the display unit 2 disappears and the content of the display on the display unit 2 becomes as shown in FIG. 9(f) by returning of the pointer. In FIG. 9, 2 represents the character 2 on the display unit 2 is flashing. Therefore, when the character 2 is flashing, by inputting "21", the data of the input variable term Y can be changed to "21" from "20" and the calculation of the equation by the changed data is performed, whereby the result of the calculation of the equation "4121" can be displayed (see FIGS. 9(g) and (h)).

In order to change the value of only the input variable term X, operation of DELETE key 3-3 two times causes the cursor to be displaced below the term X, then it becomes possible to enter the new numeric data.

Operation of $\boxed{\text{ENT}}$ key 3-1 during display of the result of the previous calculation also enables the operator to change the numeric data. In this case the program flow moves along steps S8, S18, S19 and S11, whereby all displayed data including the numeric data stored in the work area are cleared off and the state of the calculator returns to the first state as shown in FIG. 9(i), allowing input of the new numeric data. This operation is more simple than the operation of DELETE key 3-3.

In one application of the calculator as described above, a total value of a number of a calculation can be obtained. Assuming that the following equation is entered in the calculator.

PROFIT=SALE
PRICE×0.2:TAKINGS=PROFIT+TAKINGS

Figure 10:
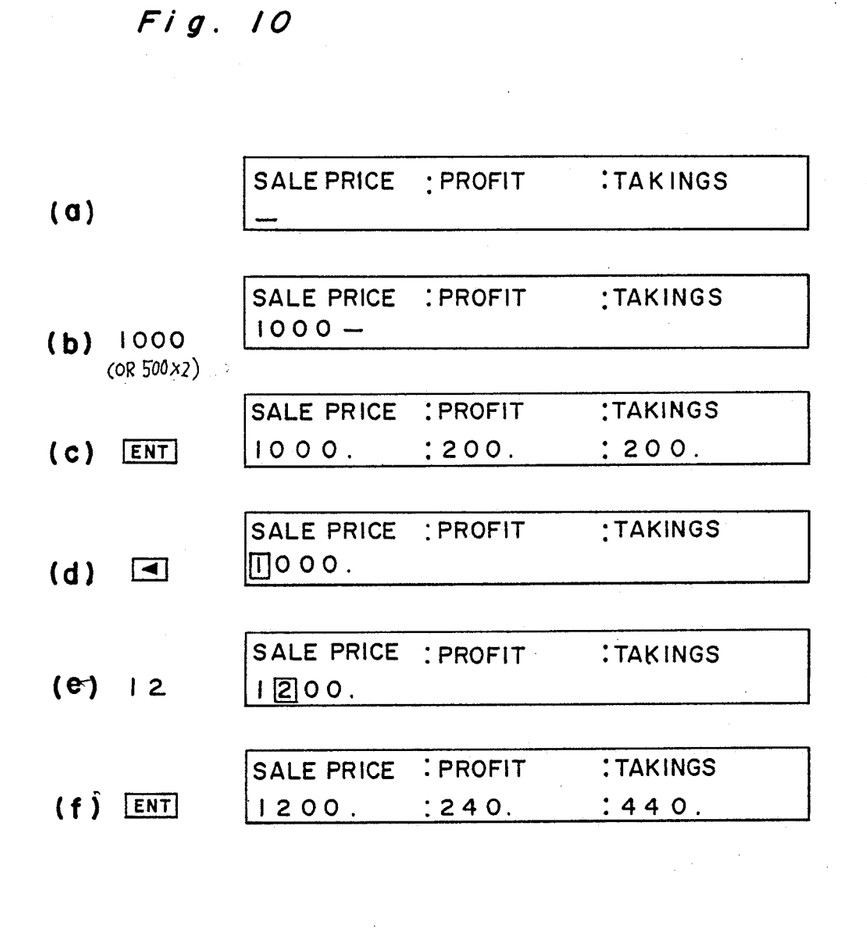

By this calculation the total TAKINGS can be obtained. FIG. 10 shows the feature of the above calculation. Upon inputting a SALE PRICE "1000" the PROFIT "200" and TAKINGS "200" are displayed. Subsequently by the operation to change the data as described above, a new SALE PRICE "1200" is input, so that the PROFIT "240" and the TAKINGS "440" can be obtained and displayed.

In a case where the number of the variable terms is too great, the calculator shown in this embodiment can display the terms as explained below.

Assuming that the equation is $$\#TOTAL=A+B+C+D:AVERAGE=-TOTAL/4,$$

in the first display, the input variable terms A,B and C are displayed on the display unit 2 and the data for A,B and C are input, subsequently in the second display the input variable terms B, C and D are displayed shifting the displaying position leftward by 8 digits. With the numeric data "40" for the input variable term D input, the displaying position is further shifted leftward by 8 digits and the names C and D of the input variable terms and the name TOTAL are displayed.

Figure 11A:
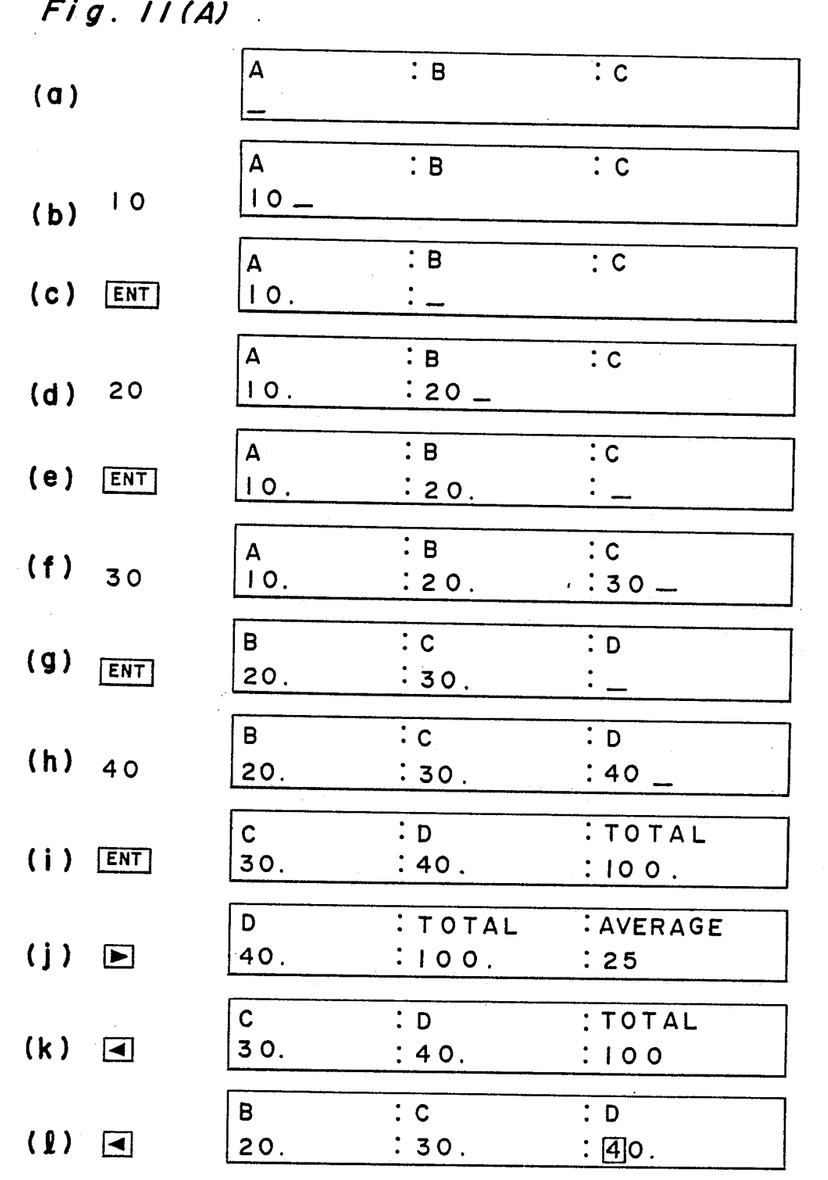
FIGS. 11(A) and 11(B) show examples of the key inputs and contents displayed by the calculator when the number of variable terms exceeds the contents of the display.
Figure 11B:
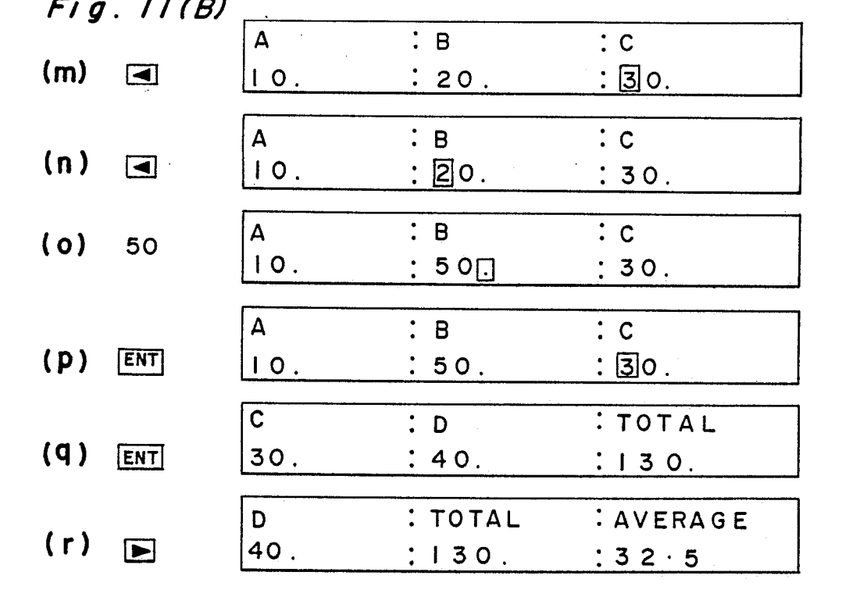

The calculator in this embodiment is so arranged as to cause the content overflown from the display unit to be displayed by the operation of either the left shifting key 3-3 or right shifting key 3-4 as shown in FIGS. 11(j) through (m).

FIGS. 11(n) through (r) show an example of changing the numeric value of the variation term B.

Figure 12:
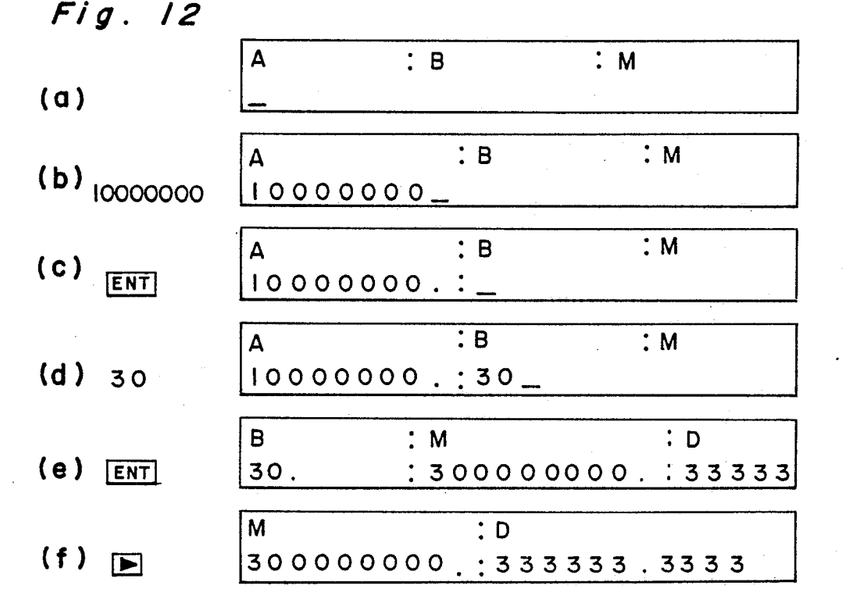
FIG. 12 shows examples of the key inputs and contents displayed by the calculator when the total number of digits for the input data or calculation result exceeds the maximum available display space.

In a case where the total number for the digits of the input data or result of calculation exceeds the maximum digits of the display unit 2, the display is made as shown in FIG. 12.

In processing the equation represented by $$\#M=A\times B:D=A/B,$$

if the number of digits of the input variable term A exceeds the maximum number of the digits of the display unit (7 digits in the present example), by entering the numeric data of the variable term, the displayed position of the terms B and M is shifted automatically as shown in FIG. 12(d). The result of the calculation can be displayed in the available range of the display unit 2. The content overflown from the display unit can be recalled by the right shift key 3-2.

In the calculator of the present example, operation of the keys # ENT causes the respective names of the output variable terms of the equations stored in RAM to be displayed on the display unit as shown in FIGS. 13(a) through (d), whereby the operator moves the cursor below the name of the desired output variable term, then he operates ENT key. By these operations, the operator can select a desired equation from a number of the equations. FIG. 13 (d) shows the example in PRO mode. If RUN mode is set, the calculation is executed with the result displayed as shown in FIG. 10(a).

Figure 13:
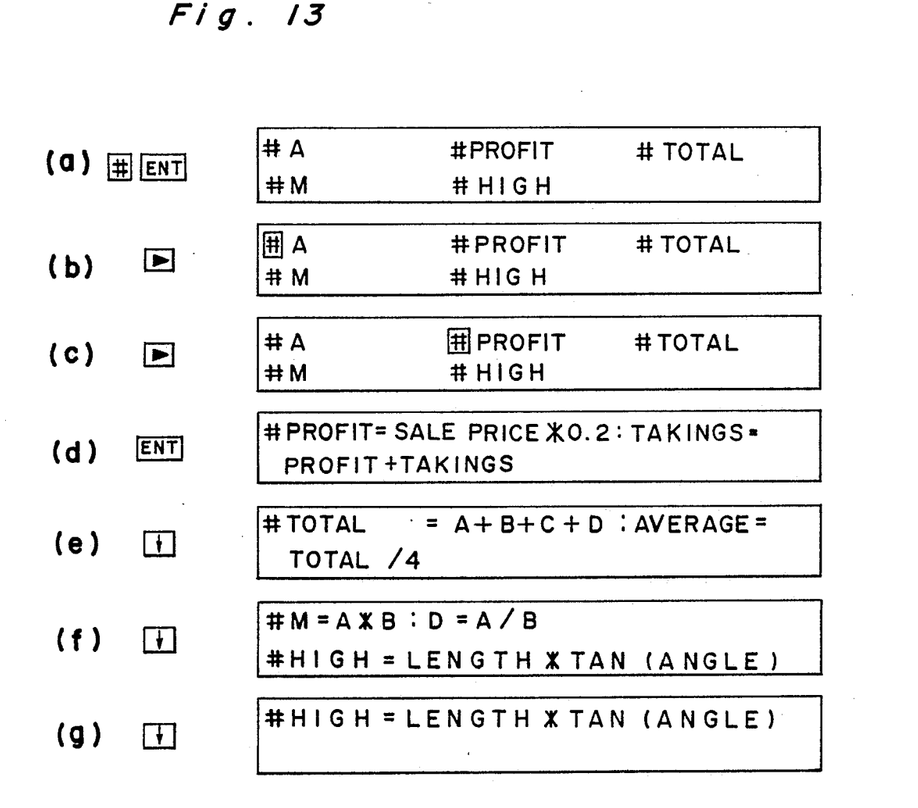
FIG. 13 shows examples of the key inputs and contents displayed when an operator is selecting an equation from a plurality of stored equations.

Operation of the key 3-5 during list display enables to display the subsequent equation as shown in FIGS. 13(e) through (g). If the content of the list is impossible to display within single line, the content can be displayed over two lines as shown in FIGS. 13(e) and (f). If the content can be displayed in a single line the second line displays the subsequent equation.

Figure 14:
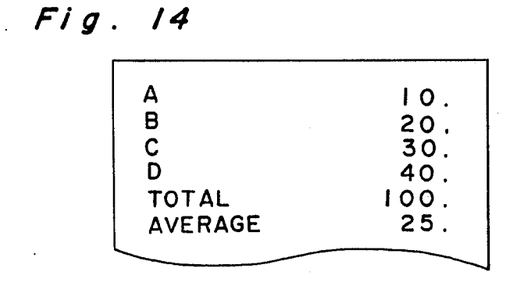
FIG. 14 is a top plan view showing one example of printed contents by the calculator according to the present invention.

The respective names of the various terms and their values can be printed as shown in FIG. 14 by the operation of the keys as shown in FIGS. 11(a) through (j).

Although the present invention is explained with reference to a preferred embodiment, various modification can be made without departing from the spirit of the present invention.

What is claimed is:

1. An electronic calculator comprising:
   first input means for inputting one or more algrebraic equations into said calculator, each of said one or more algebraic equations including an output variable term and at least one input variable term with operating elements;
   first memory means for storing equations input into said calculator according to said first input means;
   means for selecting at least one of said algebraic equations stored in said first memory means;
   second memory means for storing each of said output term and said at least one input variable term of a selected equation;
   display means for displaying each of said at least one input variable term of said selected equation;
   means for indicating any one of said at least one input variable term stored in said second memory means being displayed;
   second input means for inputting numeric data in a one-to-one visual correspondence with the indicated variable term, said input numeric data being simultaneously displayed with a corresponding variable term;
   third memory means for storing the numeric data input according to said second input means; and
   means for performing a calculation operation on a selected one of said at least one algebraic equations stored in said first memory means by substituting the numeric data from said second input means for the corresponding input variable terms;
   said display means further being for displaying a calculation result in a position of the selected equation corresponding to the output variable subsequent to said calculation operation being perform.

2. The electronic calculator according to claim 1, wherein said display means includes means for displaying the output variable terms on a leading part of the respective equations stored in said first memory means.

3. The electronic calculator according to claim 2, wherein said first input means includes means for entering an output variable, said output variable being used to select one of said one or more algebraic equations from said first memory means, and wherein the selected equation is displayed by said display means.

4. The electronic calculator according to claim 1, wherein said first memory means includes means for storing each of the at least one input variable term separately in a respective memory area corresponding to a similar memory area in said third memory means.

* * * * *